US011773898B1

(12) United States Patent
Adkins

(10) Patent No.: US 11,773,898 B1
(45) Date of Patent: Oct. 3, 2023

(54) ARTICULATED UTILITY POLE

(71) Applicant: Adkins Energy Concepts LLC, Hazard, KY (US)

(72) Inventor: John L. Adkins, Hazard, KY (US)

(73) Assignee: Adkins Energy Concepts LLC, Hazard, KY (US)

( * ) Notice: Subject to any disclaimer, the term of this patent is extended or adjusted under 35 U.S.C. 154(b) by 0 days.

(21) Appl. No.: 18/125,967

(22) Filed: Mar. 24, 2023

Related U.S. Application Data

(63) Continuation of application No. 17/985,525, filed on Nov. 11, 2022.

(51) Int. Cl.
| | | |
|---|---|---|
| *F16C 11/10* | (2006.01) | |
| *E04H 12/18* | (2006.01) | |
| *E01F 9/635* | (2016.01) | |
| *H02G 7/00* | (2006.01) | |

(52) U.S. Cl.
CPC .............. *F16C 11/10* (2013.01); *E01F 9/635* (2016.02); *E04H 12/187* (2013.01); *F16C 11/106* (2013.01); *H02G 7/00* (2013.01); *Y10T 403/11* (2015.01)

(58) Field of Classification Search
CPC ......... F16C 11/10; F16C 11/106; E01F 9/635; E04H 12/187; H02G 7/00; Y10T 403/11
USPC ............... 248/160, 900, 548; 404/10; 403/2; 52/98
See application file for complete search history.

(56) References Cited

U.S. PATENT DOCUMENTS

| | | | | |
|---|---|---|---|---|
| 1,800,010 A | * | 4/1931 | Emerson ................... | E03B 9/02 40/608 |
| 2,629,465 A | * | 2/1953 | Rhea ...................... | E04H 12/187 403/100 |
| 4,435,930 A | * | 3/1984 | Plym ....................... | E01F 9/635 52/309.1 |
| 6,264,162 B1 | * | 7/2001 | Barnes .................... | E01F 9/635 248/548 |
| 6,560,906 B1 | * | 5/2003 | Hillstrom ............ | G09F 15/0056 40/607.01 |
| 7,108,445 B2 | * | 9/2006 | Henriques .......... | A47G 29/1216 403/291 |
| 7,588,049 B2 | * | 9/2009 | Blyth .................... | F16K 27/006 137/272 |
| 2011/0272190 A1 | * | 11/2011 | Rouse ...................... | H02G 7/04 174/45 TD |

* cited by examiner

*Primary Examiner* — Brent W Herring
(74) *Attorney, Agent, or Firm* — Meunier Carlin & Curfman LLC

(57) ABSTRACT

Disclosed and described herein are embodiments of an articulated utility pole that facilitates repair and/or reinstallation in the event of damage to the pole caused by wind loading (e.g., storms), trees or other items striking the utility lines, collisions with the poles, and the like. Also disclosed herein are methods of repairing and/or re-installing the articulated utility pole. Further disclosed herein are components for fabricating an articulated utility pole.

9 Claims, 8 Drawing Sheets

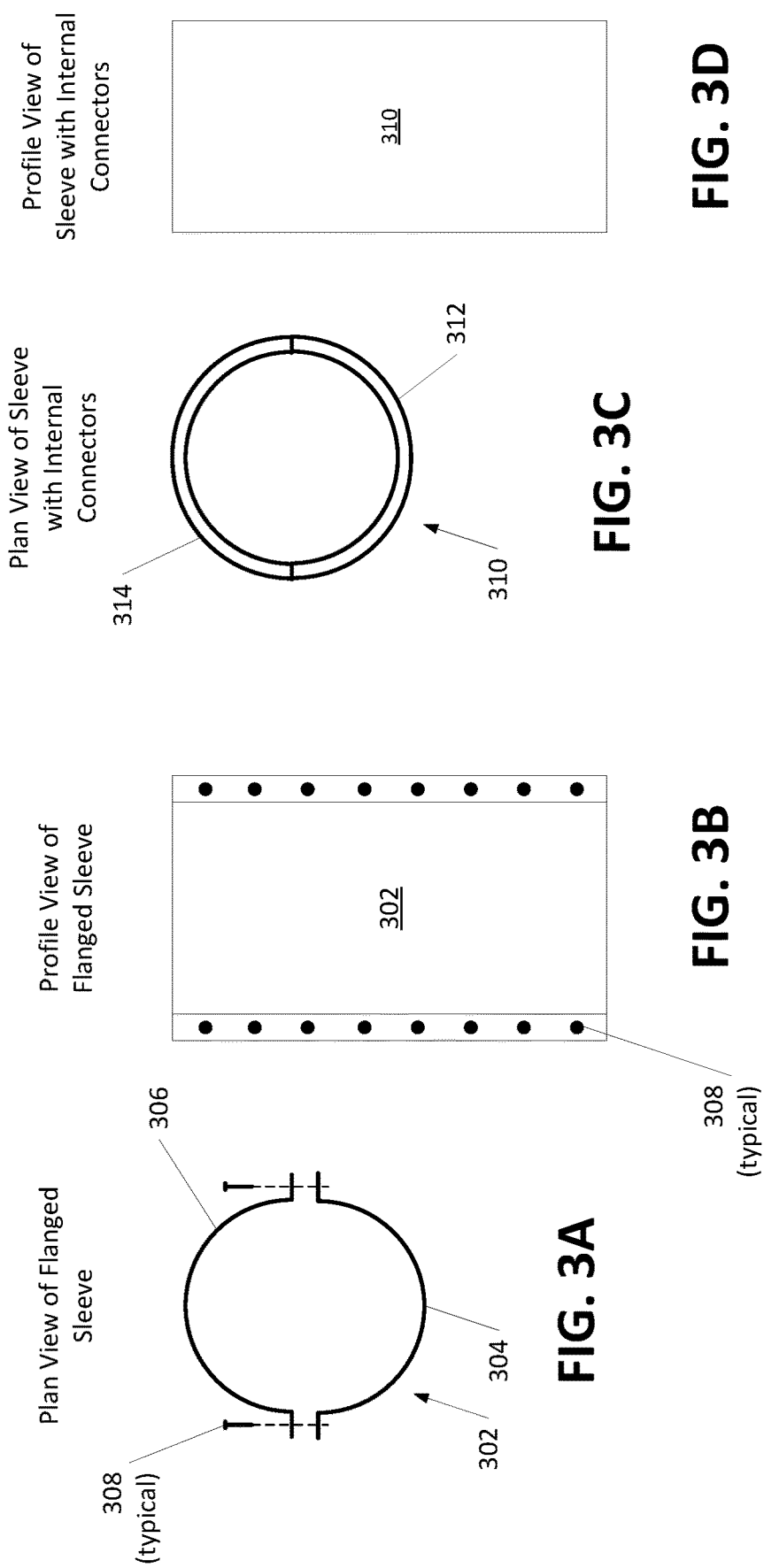

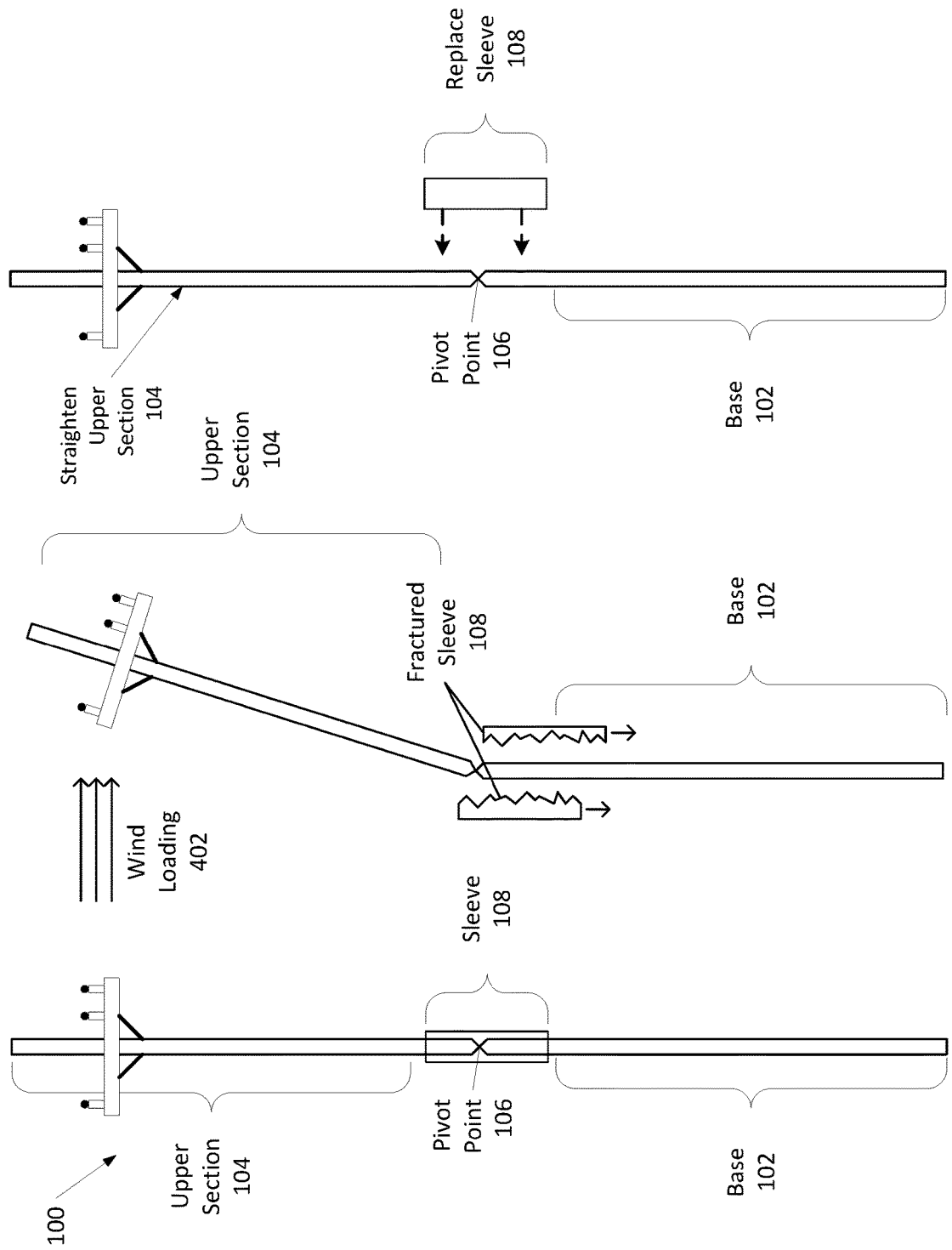

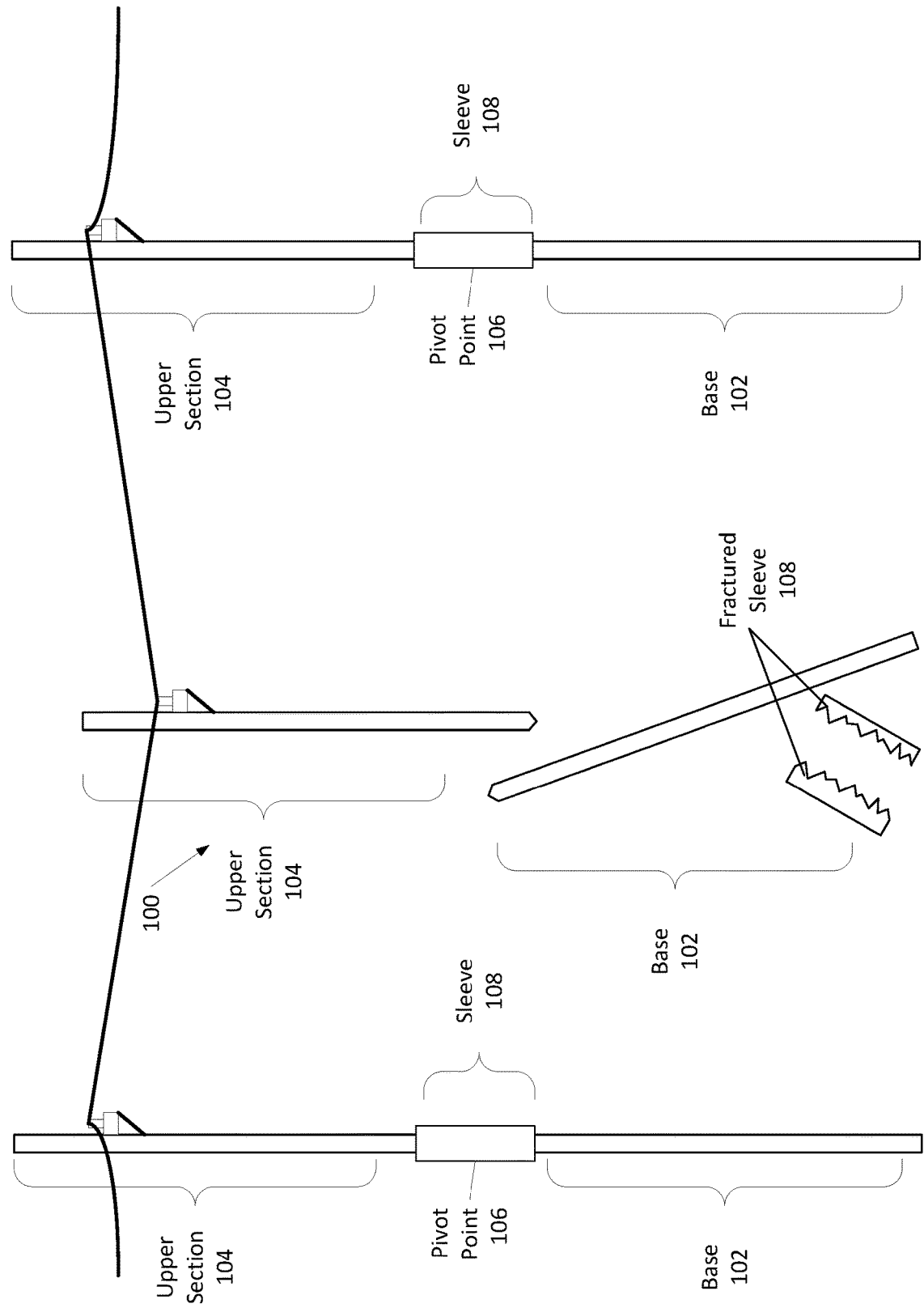

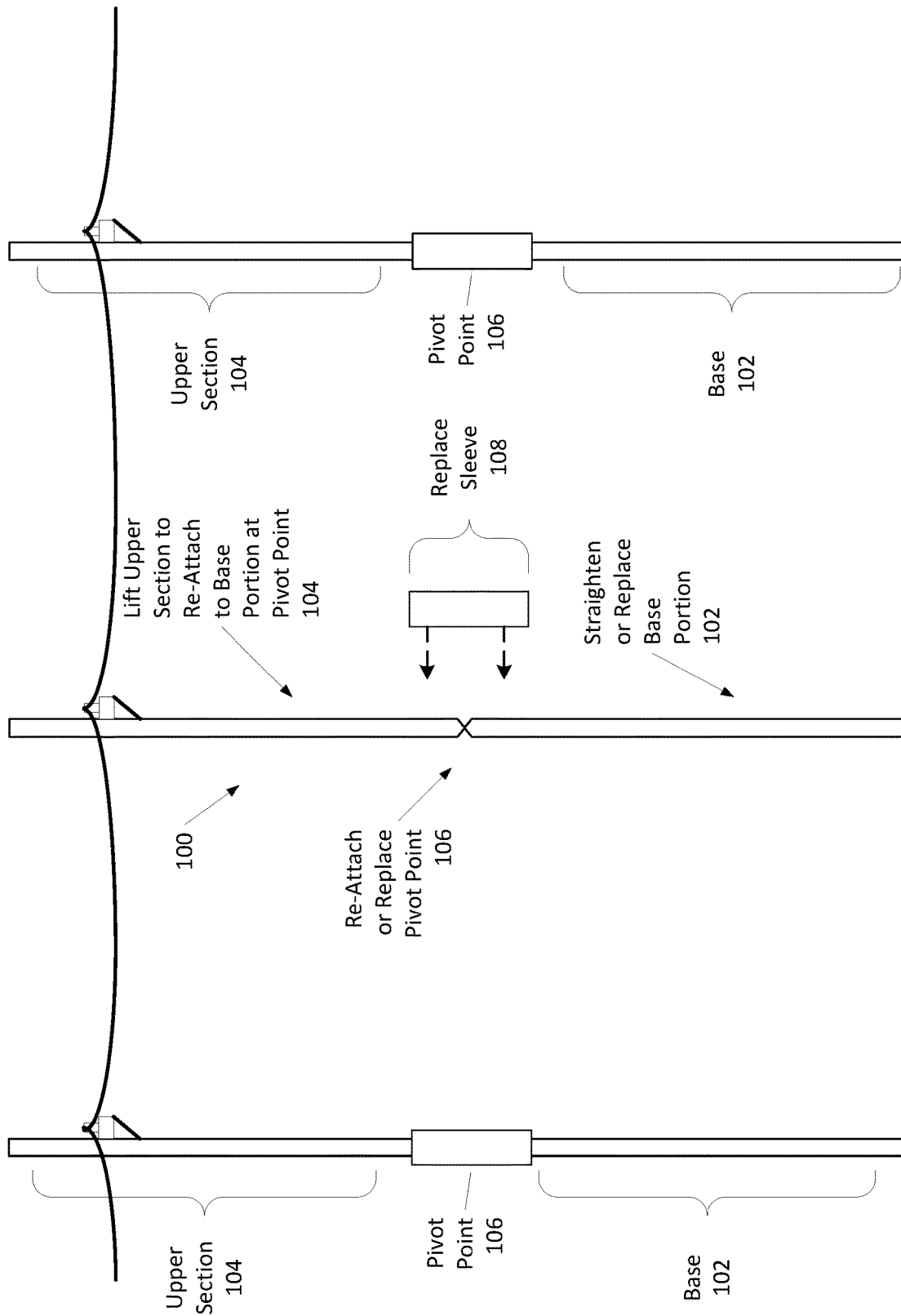

ARTICULATED UTILITY POLE

CROSS REFERENCE TO RELATED APPLICATION

This application is a continuation application of U.S. Ser. No. 17/985,525 filed Nov. 11, 2022, which is fully incorporated by reference.

BACKGROUND

Storms and other natural events, as well as traffic collisions, rot, insect infestations, bird/animal damage wreak havoc on conventional utility poles. Even though the conductors (i.e., "lines") that span between poles may suspend the top section of a broken or damaged pole in the air, the normal course for correcting such damage is replacing the pole in its entirety and transferring the lines from the damaged pole to the new pole. This is an extremely laborious and time-intensive process.

Therefore, what is needed is a utility pole that overcomes challenges in the art, some of which are described above. In particular, what is needed is a method to use an articulated utility pole for quick repair and re-installation of utility services.

SUMMARY

Disclosed and described herein are embodiments of an articulated utility pole that facilitates repair and/or reinstallation in the event of damage to the pole caused by wind loading (e.g., storms), trees or other items striking the utility lines, collisions with the poles, and the like. Also disclosed herein are methods of repairing and/or re-installing the articulated utility pole. Further disclosed herein are components for fabricating an articulated utility pole.

Additional aspects and advantages will be set forth in part the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIGS. 3A and 3B illustrate exemplary embodiments of a flanged sleeve comprised of two (or more) sections, where each section is bolted to an adjoining section to span the perimeter or circumference of the pole sections proximate the pivot point;

FIGS. 3C and 3D illustrate another example of a sleeve comprised of multiple sections that interlock or internally connect (do not use a flange or external bolts);

FIGS. 4A-4C illustrate operation of the various embodiments of the disclosed articulated utility pole;

FIGS. 5A-5F illustrate an alternate operation of various embodiments of the disclosed articulated utility pole.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figures 1A, 1B:
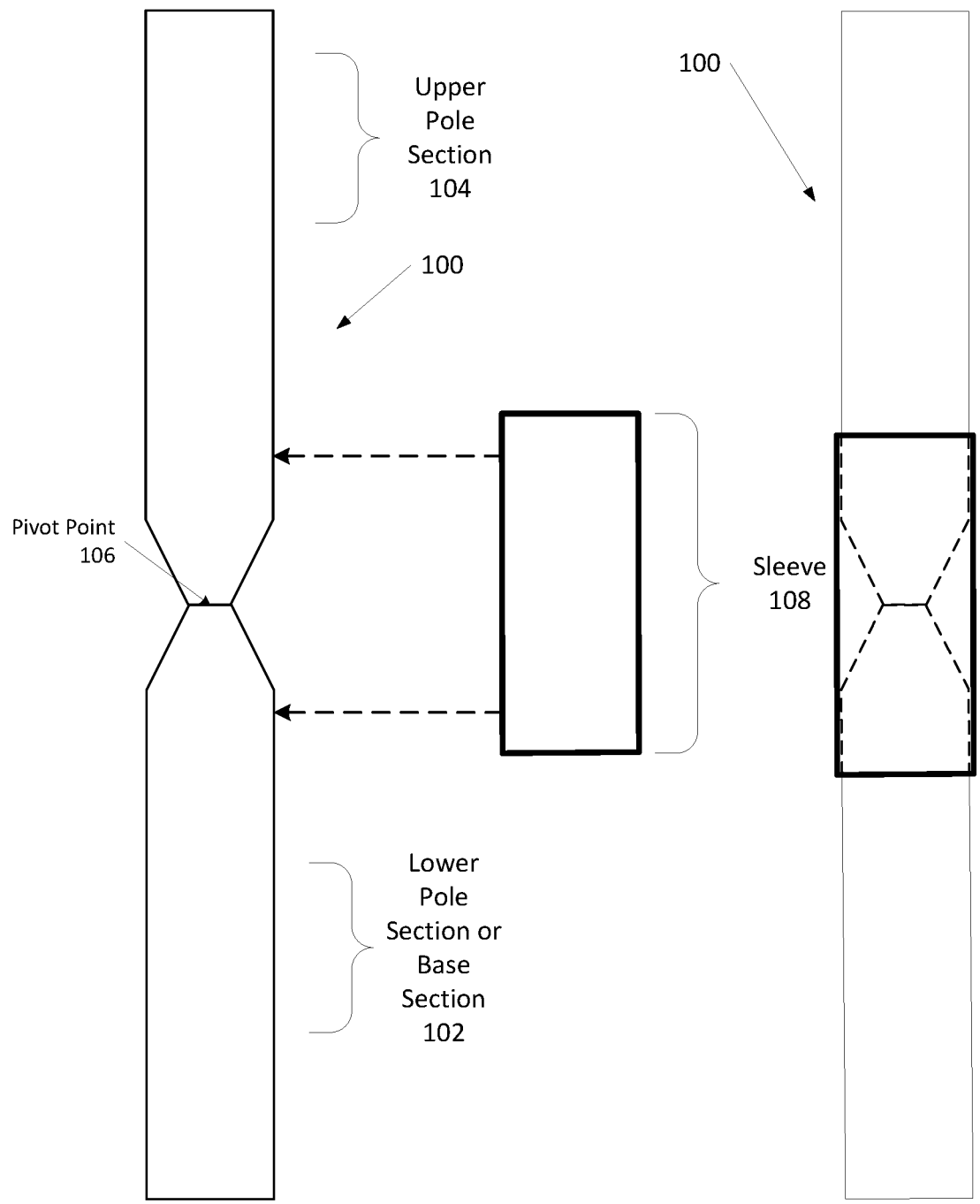
FIG. 1A illustrates an exemplary articulated utility pole.
FIG. 1B illustrates an exemplary articulated utility pole with an installed sleeve.

FIG. 1A illustrates an exemplary articulated utility pole 100. The pole 100 is comprised of multiple sections. For example, there is a first section (e.g., a lower pole section 102 or an upper pole section 104), and a second section (e.g., a lower pole section 102 or an upper pole section 104). The sections 102, 104 are connected at a pivot point 106. The pivot point 106 while connecting two sections of the pole together, allows one section to move relative to another, or for the two connected sections to move independently of the other. Further comprising the articulated utility pole is a sleeve 108. The sleeve has a shape that conforms to the exterior of two sections of the pole proximate the pivot point 106. While generally shaped as a hollow cylinder, the sleeve 108 may have any shape such that its interior shape adapts to the exterior shape of the sections 102, 104 of the pole 100 proximate the pivot point 106. When installed, as shown in FIG. 1B, the sleeve 108 bridges the two sections 102, 104 together at the pivot point 106. In this manner, the sleeve 106 connects the first section 102 to the second section 104 and prevents one section from moving relative to the other, or for the two connected sections to move independently of the other. The sleeve 106 is configured such that it will fail before the sections 102, 104 of the pole based on force applied to any section or sections of the pole 100 and/or to the sleeve. Such configuration may involve the thickness of the sleeve 108, its length (how far it extends along each pole section 102, 104 from the pivot point 106), its shape, the material it is comprised of, and the like.

Figure 2A:
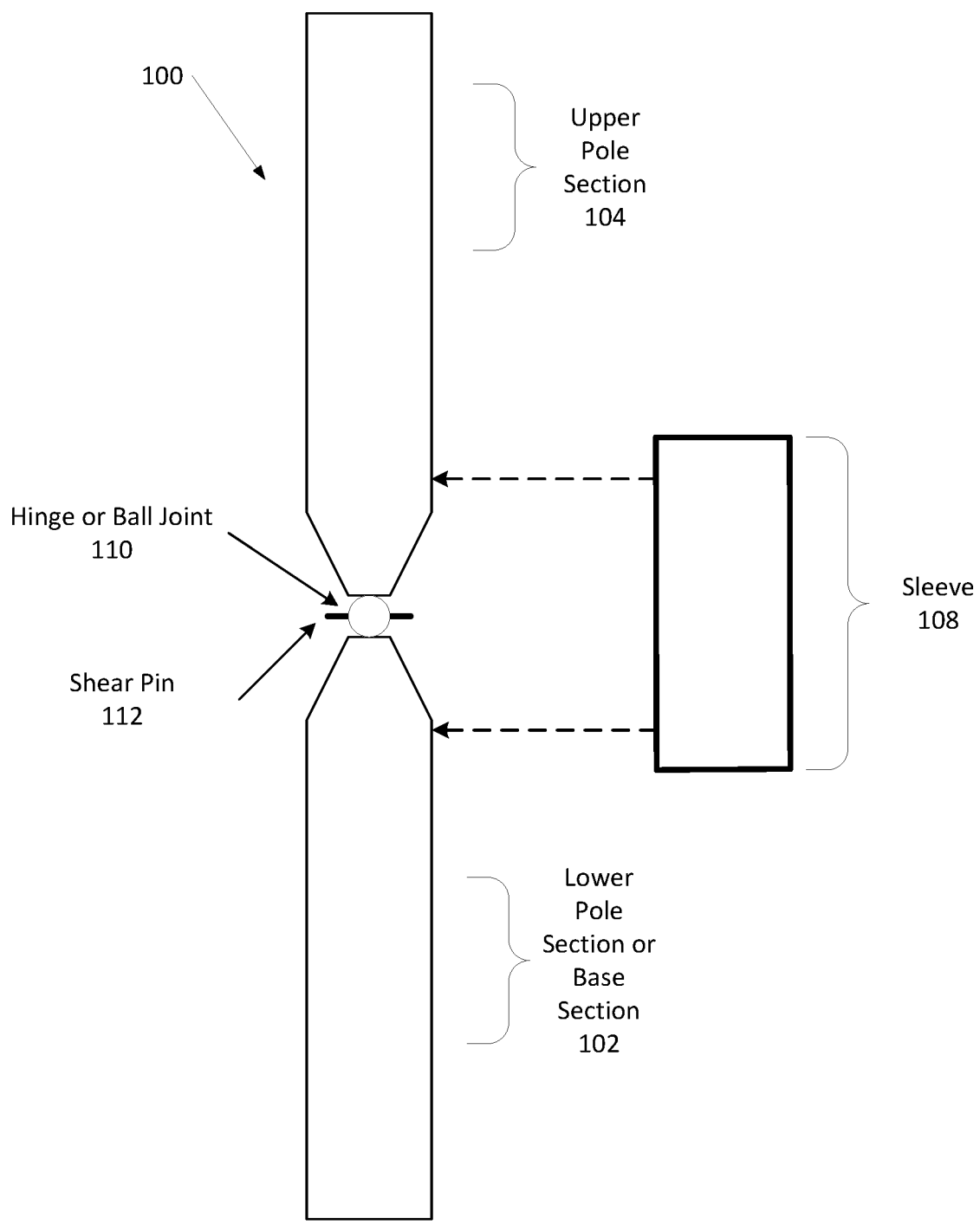
FIG. 2A illustrates an exemplary pivot point of an articulated utility pole comprised of a hinge or ball joint.
Figure 2B:
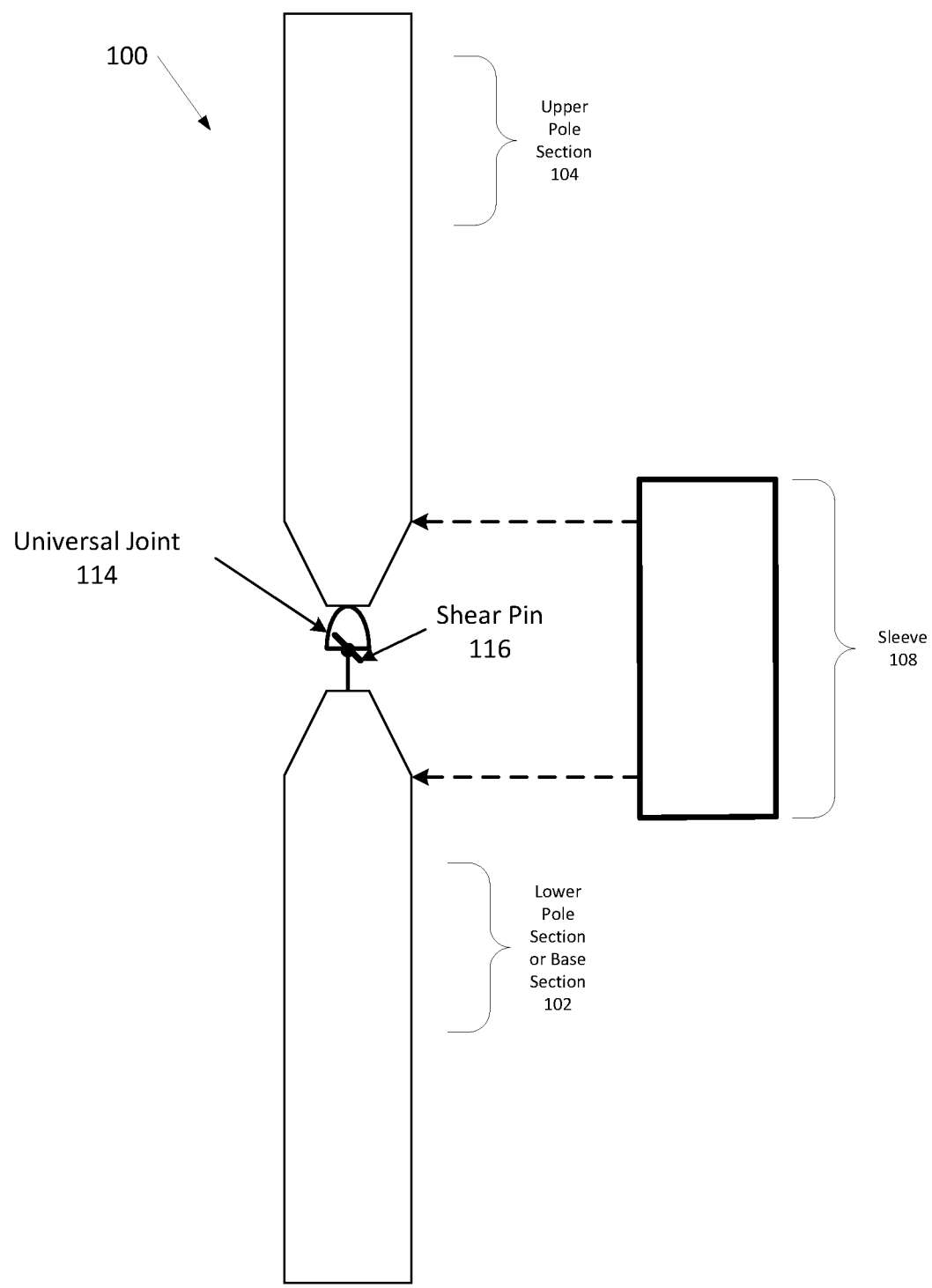
FIG. 2B illustrates an exemplary pivot point of an articulated utility pole comprised of a universal joint.

As noted above, the pivot point 106 connects two sections 102, 104 of the pole together, and allows one section to move relative to another, or for the two connected sections to move independently of the other. However, such movement is not desired until the sleeve 108 fails (e.g., fractures). The pivot point 106 may be comprised of any joint that both connects two sections of the pole 100 together and allows at least on section to articulate relative to the other. For example, as shown in FIG. 2A, the pivot point 106 may be comprised of a hinge or ball joint 110, as are known in the art. In some instances, the hinge or ball joint 110 may further comprise a shear pin 112. Once the two sections of the pole are aligned, the shear 112 pin is inserted into the hinge or ball joint 110, which holds the two sections in their aligned position during installation of the sleeve 108. FIG. 2B illustrates another form of the pivot point 106 comprised of a universal joint 114, as known in the art. The universal joint 114 may further be comprised of one or more shear pins 116, which maintain alignment of the two pole sections 102, 104 for installation of the sleeve 108. The pivot points 106 shown in FIGS. 2A and 2B are only non-limiting examples of the types of pivot points that may be used in embodiments of the invention. Any pivot point 106 that connects two sections of the pole together, and allows one section to move relative to another, or for the two connected sections to move independently of the other is contemplated within the scope of this disclosure.

Also as noted above, the sleeve 108 is configured to bridges the two sections 102, 104 together at the pivot point 106 and prevent one section from moving relative to the other, or for the two connected sections to move independently of the other, until the sleeve fails. The sleeve 106 is further configured such that it will fail before the sections 102, 104 of the pole based on force applied to any section or sections of the pole 100 and/or to the sleeve 108. FIGS. 3A through 3D illustrate exemplary embodiments of sleeves 108. FIG. 3A illustrates a plan view of a flanged sleeve 302 comprised of two (or more) sections 304, 306, where each section is bolted to an adjoining section to span the perimeter or circumference of the pole sections 102, 104 proximate the pivot point 106. Each section 304, 306 may be comprised of various materials of various strengths having various thicknesses such that the sections of the sleeve 302 and/or the bolts 308 that connect the various sections are configured to fail in the presence of loading or force applied to any of the pole sections 102, 104 and/or the sleeve 302. Though FIGS. 3A and 3B illustrate a sleeve 302 comprised of two sections 304, 306, it is to be appreciated that sleeves having more than two sections are contemplated within the scope of this disclosure. FIGS. 3C and 3D illustrate another example of a sleeve 310 comprised of multiple sections that interlock or internally connect (do not use a flange or external bolts). Such connection may be, for example, snap lock, friction fit, and the like. Though FIGS. 3C and 3D illustrate a sleeve 310 comprised of two sections 312, 314, it is to be appreciated that sleeves having more than two sections are contemplated within the scope of this disclosure. Sleeves, or sections of sleeves, may be comprised of various materials including metal, plastic, fiberglass, wood, and the like.

FIGS. 4A-4C illustrate operation of the various embodiments of the disclosed articulated utility pole 100. As shown in FIG. 4A, the pole 100 comprised of two sections 102, 104 having a pivot point 106 that is encompassed by a sleeve 108 is installed. In FIG. 4B, wind loading 402 is applied to the pole 100 and/or the utility lines, causing the sleeve 108 to fail and fracture. The fractured sleeve 108 separates from the pole 100, allowing the sections 102, 104 of the pole 100 to articulate. If the pivot point 106 utilizes a shear pin, the shear pin is also sheared allowing movement of the pivot point 106 and allowing the sections 102, 104 of the pole 100 to articulate. Note that although the two sections 104, 106 of the pole 100 articulate, they remain connected to one another. The articulation of the two sections 102, 104 of the pole 100 after failure of the sleeve 108 (and any optional shear pin) prevents the pole from fracturing, as happens with conventional utility poles exposed to high wind loading. Advantageously, because the pole 100 has not failed, it does not require replacement—an extremely time-intensive and costly process. Rather, as shown in FIG. 4C, the pole 100 can be quickly repaired by aligning the upper section 104 with the lower section 102, re-installing a shear pin in the pivot point 106 (if it utilizes a shear pin), and replacing the sleeve 108.

FIGS. 5A-5F illustrate an alternate operation of the disclosed articulated utility pole 100. In this instance, the pole 100 has received a force to its lower section 102. Typically, such a force would occur because of a vehicle striking the lower section 102 of the pole 100. In this instance, the sleeve 108 fractures and the pivot point 106 articulates. The pole 100 may be repaired by straightening the lower section 102 relative to the upper section 104, re-installing a shear pin in the pivot point 106 (if it utilizes a shear pin), and replacing the sleeve 108. Alternatively, if the force applied to the lower section 102 is so severe that it separates the lower section 102 from the upper section 104 at the pivot point 106, then the lower section 102 can be straightened or replaced (as needed). The upper section 104 will typically remain suspended by the utility lines. Once the lower section 102 is straightened or replaced, the pivot point 106 can be replaced (if damaged), and/or the two sections 102, 104 can be reconnected at the pivot point 106, the shear pin inserted (if utilized), aligned and a new sleeve 108 installed. Advantageously, this form of operation prevents having to replace the entire pole and transfer the utility lines and other attachments that are attached to the upper section 104 of the pole 100.

Figure 6A:
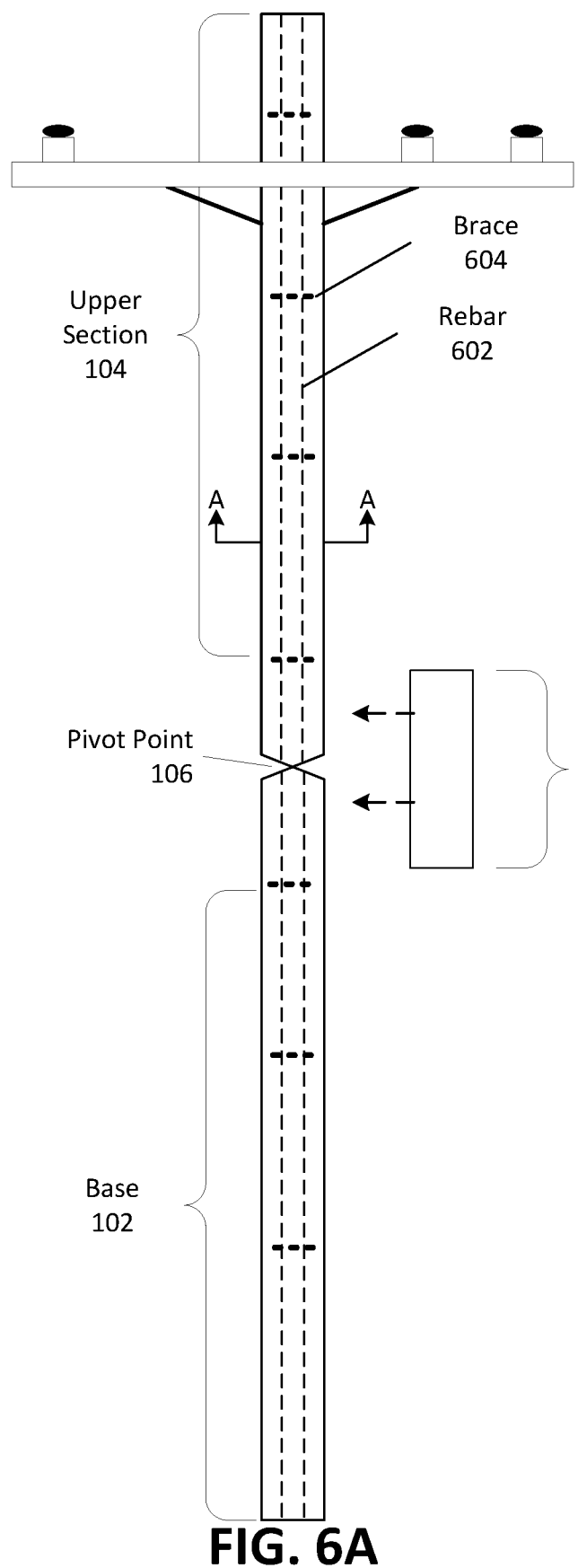
FIGS. 6A-6C illustrate components for fabricating an exemplary articulated utility pole.
Figure 6B:
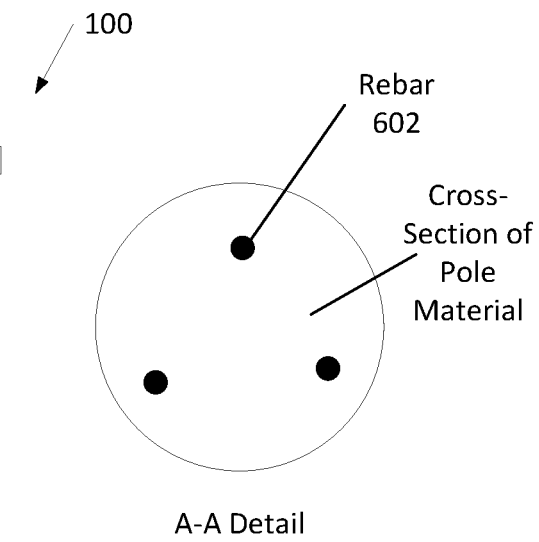
Figure 6C:
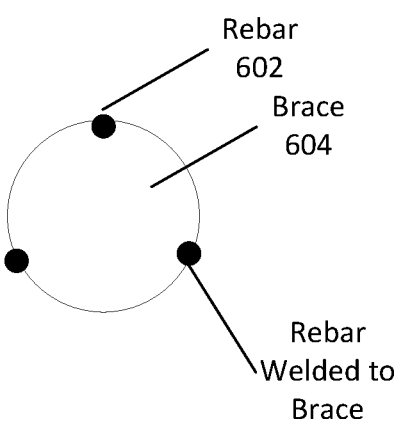

FIGS. 6A-6C illustrate components for fabricating an exemplary articulated utility pole. It is to be appreciated that FIGS. 6A-6C illustrate only one type of pole 100 according to the disclosed embodiments and numerous other materials are contemplated within the disclosure. Other materials include wood, metal, fiberglass, concrete, cement, composites, and the like. Referring back to FIGS. 6A-6C, this embodiment of the articulate pole 100 is comprised of plastic with metal (rebar) reinforcement. The rebar 602 runs vertically in each of the sections 102, 104 and is held in place by braces 604 spaced apart and embedded in the plastic of the pole sections 102, 104. Typically, there are a plurality of vertically-run rebar 602 in each of the pole sections 102, 104. Typically, there are also a plurality of spaced-apart braces 604 in each of the pole sections 102, 104. For example, as shown in the A-A Detail of FIG. 6B, there are three vertical runs of rebar 602 in a cross-section of the pole 100. Though FIG. 6B shows three pieces of vertical rebar 602, it is to be appreciate that there may be more or fewer rebar pieces in each section 102, 104. FIG. 6C illustrates an exemplary brace 604. The brace 604 has a smaller diameter than the pole 100 such that the brace can be embedded in the material (i.e., plastic) that comprises the pole 100. The brace 604 is comprised of material such that the rebar 602 can be welded to the brace 604 for additional strength. Fabrication of the reinforced plastic articulated utility pole shown in FIGS. 6A-6C may comprise placing the rebar 602 and braces 604 for each pole section 102, 104 in a mold, where the rebar 602 is held in place at each end of the mold, and pouring melted plastic into the mold such that it fully encompasses the rebar 602 and braces 604. After cooling, the mold is removed, the pivot point 106 installed on the reinforced plastic articulated utility pole sections 102, 104, thus connecting the two sections 102, 104. In some instances, the plastic used for the reinforced plastic articulated utility pole sections may comprise recycled plastic materials. In some instances, the recycled plastic may comprise at least in part plastics removed from the world's oceans.

Embodiments of the disclosed articulated utility pole may be fabricated in any height desired such as, for example, 20', 30', 40', 50', 60' or any other desired height. Embodiments of the disclosed articulated utility pole may be fabricated having an exterior that is round, oval, square, rectangular, hexagonal, octagonal, triangular or any other shape. In some instances, embodiments of the disclosed articulated utility pole may be fabricated having a taper from the base to the top of the pole. In other words, the base may have a large diameter or perimeter than the top of the pole.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of re-erecting an articulated utility pole, said method comprising:
    providing the articulated utility pole having a first section and a second section connected by a pivot point that is encompassed by a sleeve, said sleeve having a shape that conforms to an exterior of the first pole section and the second pole section proximate the pivot point, wherein the sleeve bridges the first pole section and the second pole section at the pivot point preventing one section of the pole from moving relative to the other section and preventing the two connected pole sections to move independently of the other, wherein the sleeve is configured such that it will fail before the first pole section or second pole section based on a force applied to any of the first pole section, the second pole section and/or to the sleeve,
    wherein at least one of the first pole section or the second pole section are comprised of plastic with metal (rebar) reinforcement, wherein the rebar runs vertically in the first pole section or the second pole section and is held in place by braces spaced apart and embedded in the plastic of the pole section,
    wherein when the sleeve has been fractured and the first section has moved with respect to the second section or the second section has moved with respect to the first section;
    then:
        aligning the first section and the second section; and
        replacing the sleeve.

2. The method of claim 1, wherein the first section is an upper section of the articulated utility pole and the second section is a lower section of the articulated utility pole, or wherein the first section is the lower section of the articulated utility pole and the second section is the upper section of the articulated utility pole.

3. The method of claim 2, wherein the lower section of the articulated utility pole is replaced prior to aligning the first section with the second section.

4. The method of claim 1, wherein the pivot point is comprised of a universal joint, and wherein the pivot point further comprises a shear pin, wherein when the first pole section and the section pole section are aligned the shear pin is inserted into the universal joint to hold the first pole section and the second pole section in their aligned position during installation of the sleeve.

5. The method of claim 1, wherein the pivot point is comprised of a hinge or ball joint.

6. The method of claim 5, wherein the hinge or ball joint further comprises a shear pin, wherein when the first pole section and the section pole section are aligned the shear pin is inserted into the hinge or ball joint to hold the first pole section and the second pole section in their aligned position during installation of the sleeve.

7. The method of claim 1, wherein the first pole section and or the second pole section are comprised of one or more of reinforced plastic, wood, metal, fiberglass, concrete, cement, or composite materials.

8. The method of claim 1, wherein the first pole section is comprised of plastic with metal (rebar) reinforcement and there are a plurality of vertically-run rebar in the first pole section, or wherein the second pole section is comprised of plastic with metal (rebar) reinforcement and there are a plurality of vertically-run rebar in the second pole section.

9. The method of claim 1, wherein the plastic used for the first pole section or the second pole section is comprised of recycled plastic materials, and wherein the recycled plastic materials comprise at least in part waste plastics recovered from an ocean.

\* \* \* \* \*